(12) United States Patent  
Umeda et al.

(10) Patent No.: US 7,528,088 B2  
(45) Date of Patent: May 5, 2009

(54) ELECTRONIC DEVICE

(75) Inventors: Yuji Umeda, Chuo-ku (JP); Satoko Ueda, Chuo-ku (JP); Yoshinori Fujikawa, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 129 days.

(21) Appl. No.: 11/390,113

(22) Filed: Mar. 28, 2006

(65) Prior Publication Data

US 2006/0251927 A1 Nov. 9, 2006

(30) Foreign Application Priority Data

Apr. 1, 2005 (JP) .............................. 2005-106477  
Apr. 1, 2005 (JP) .............................. 2005-106495

(51) Int. Cl.  
*C04B 35/468* (2006.01)  
*H01G 4/06* (2006.01)

(52) U.S. Cl. .................. 501/139; 501/137; 501/138; 428/701; 428/702; 361/321.4

(58) Field of Classification Search .......... 501/134, 501/135, 136, 137, 138, 139; 428/701, 702; 361/321.4  
See application file for complete search history.

(56) References Cited

U.S. PATENT DOCUMENTS

| 4,870,539 | A |   | 9/1989 | Chance et al. | |
|---|---|---|---|---|---|
| 5,097,391 | A | * | 3/1992 | Nomura et al. | 361/321.4 |
| 5,319,517 | A | * | 6/1994 | Nomura et al. | 361/321.4 |
| 5,335,139 | A |   | 8/1994 | Nomura et al. | |
| 5,650,367 | A | * | 7/1997 | Fujikawa et al. | 501/139 |
| 5,757,610 | A | * | 5/1998 | Wada et al. | 361/311 |
| 5,977,006 | A | * | 11/1999 | Iguchi et al. | 501/137 |
| 6,548,437 | B2 | * | 4/2003 | Sato et al. | 501/139 |
| 6,656,865 | B2 | * | 12/2003 | Saito et al. | 501/137 |
| 6,756,335 | B2 | * | 6/2004 | Okawa | 501/136 |
| 6,764,976 | B2 | * | 7/2004 | Kobayashi et al. | 501/139 |
| 6,900,977 | B2 | * | 5/2005 | Nakamura et al. | 361/321.2 |
| 2002/0013213 | A1 |   | 1/2002 | Sato et al. | |
| 2002/0016249 | A1 |   | 2/2002 | Saito et al. | |
| 2004/0176239 | A1 |   | 9/2004 | Nakamura et al. | |

FOREIGN PATENT DOCUMENTS

| EP | 0 423 738 A2 | 4/1991 |
|---|---|---|
| EP | 0 794 542 A2 | 9/1997 |
| EP | 0 877 399 A2 | 11/1998 |
| EP | 1 262 467 A1 | 12/2002 |
| JP | A 5-9066 | 1/1993 |
| JP | A 11-302071 | 11/1999 |
| JP | A 2002-29836 | 1/2002 |
| JP | A-2004-107200 | 4/2004 |
| JP | A-2005-022890 | 1/2005 |
| JP | 2005067981 * | 2/2005 |

* cited by examiner

*Primary Examiner*—Karl E Group  
(74) *Attorney, Agent, or Firm*—Oliff & Berridge, PLC

(57) ABSTRACT

A multilayer ceramic capacitor 1 having dielectric layers 2 having barium titanate or barium calcium titanate as a main ingredient. When the dielectric layers are barium titanate, the ratio of the grains having a thickness of the crystal grain boundaries 22 present between adjoining dielectric grains 20 is 30% to 95% of the plurality of dielectric grains 20 forming the dielectric layers 2. When the dielectric layers 2 are barium calcium titanate, the ratio of the grains having a thickness of the crystal grain boundaries 22 present between adjoining dielectric grains 20 is 20% to 70% of the plurality of dielectric grains 20 forming the dielectric layers 2.

12 Claims, 6 Drawing Sheets

ELECTRONIC DEVICE

BACKGROUND OF THE INVENTION

1. Field of the Invention

The present invention relates to a multilayer ceramic capacitor or other electronic device, more particularly relates to a small-sized, large capacity electronic device superior in dielectric constant and other electrical characteristics, superior in temperature characteristic even when the dielectric layers are made thin, and high in reliability.

2. Description of the Related Art

In recent years, electrical products have been made increasingly smaller in size and higher in performance. Along with this, electronic devices are also being asked to be made smaller in size and higher in performance. In the case of an electronic device constituted as a multilayer ceramic capacitor, in particular a high capacity and high reliability are being sought.

However, to obtain a small sized, high capacity multilayer ceramic capacitor, the dielectric ceramic layers and internal electrode layers have to be made thin. Along with this, however, the reliability ends up deteriorating. On the other hand, to obtain a small sized, high reliability multilayer ceramic capacitor, the dielectric ceramic layers and internal electrode layers have to be made thin, but with this a high capacity cannot be obtained.

As a method for obtaining a high capacity and high reliability multilayer ceramic capacitor, for example, Document 1 (Japanese Patent Publication (A) No. 5-9066) proposes a dielectric ceramic composition satisfying the EIA X7R characteristic, exhibiting a high dielectric constant, and having a high insulation resistance. However, with the method shown in this Document 1, for example, when making the dielectric ceramic layers a thin 3 μm or less, it is not always possible to obtain a reliability satisfying the demands of the market.

Further, Document 2 (Japanese Patent Publication (A) No. 2001-316176) discloses to use a fine dielectric powder having $BaTiO_3$ as its main ingredient and limit the maximum grain size and grain size distribution so as to obtain a fine dielectric ceramic exhibiting good electrical characteristics. By making the dielectric ceramic finer, a higher reliability can be obtained.

However, in Document 2, a thickness of the dielectric ceramic layers of 30 μm is envisioned. When making the dielectric ceramic layers a thin 3 μm or less, a reliability satisfying the demands of the market probably cannot be obtained. For example, in Document 2, Mn or Mg or another sub ingredient is added in a very large amount, but if excessively adding an additive composition, donor or acceptor ingredients segregate at the crystal grain boundaries etc. and therefore the multilayer ceramic capacitor probably drops in reliability. That is, with the method described in this Document 2, when making the dielectric layers thinner, problems such as an increase in insulation defects or a drop in the lifetime or other aspects of reliability are expected.

Further, Document 3 (Japanese Patent Publication (A) No. 11-302071) and Document 4 (Japanese Patent Publication (A) No. 2002-29836) disclose using a main material comprised of a $Ba_{1-x}Ca_xTiO_3$ base material where Ba is substituted by Ca so as to obtain a dielectric ceramic composition satisfying the X7R characteristic and giving a high reliability. However, with the methods described in these patent documents, there is a large deterioration in the capacity with respect to the DC voltage and the demands of the market are not sufficiently satisfied.

SUMMARY OF THE INVENTION

The present invention was made in consideration of this actual situation and has as its object the provision of a small sized, large capacity multilayer ceramic capacitor or other electronic device superior in dielectric constant or other electrical characteristics, superior in temperature characteristic even when making the dielectric layers thin, and high in reliability.

The inventors discovered that even when the dielectric layers are reduced in thickness to for example 5 μm or less or 3 μm or less, it is possible to control the thickness of the crystal grain boundaries between the crystal grains forming the dielectric layers to a suitable value so as to obtain a small sized, large capacity multilayer ceramic capacitor or other electronic device which satisfies the JIS B characteristic and EIA X5R characteristic and gives a high reliability and thereby completed the present invention.

That is, the electronic device according to a first aspect of the present invention is an electronic device having dielectric layers comprised of barium titanate as their main-ingredient, characterized in that in the plurality of ceramic grains forming the dielectric layers, the ratio of grains with a thickness of crystal grain boundaries present between adjoining ceramic grains of 1 nm or less is 30% to 95% of the total.

In the first aspect of the present invention, preferably, the ratio of grains with a thickness of crystal grain boundaries present between adjoining ceramic grains of 0.75 nm or less is 40% to 90% of the total.

The electronic device according to a second aspect of the present invention is an electronic device having dielectric layers comprised of barium calcium titanate expressed by $Ba_{1-x}Ca_xTiO_3$ ($0.001 \leq x \leq 0.15$) as their main ingredient, characterized in that in the plurality of ceramic grains forming the dielectric layers, the ratio of grains with a thickness of crystal grain boundaries present between adjoining ceramic grains of 1 nm or less is 20% to 70% of the total.

In the second aspect of the present invention, preferably, the ratio of grains with a thickness of crystal grain boundaries present between adjoining ceramic grains of 0.75 nm or less is 25% to 65% of the total.

In the first and second aspects of the present invention, if the ratio of the grains with a thickness of the crystal grain boundaries of 1 nm or less or 0.75 nm or less is too small, the dielectric layers tend become lower in dielectric constant and shorter in insulation resistance lifetime. Further, if the ratio of the grains with a thickness of the crystal grain boundaries of 1 nm or less or 0.75 nm or less is too large, the dielectric layers tend to become shorter in insulation resistance lifetime and the temperature characteristic to become worse.

Preferably, the dielectric layers have a thickness of 4.5 μm or less, more preferably 3 μm or less, particularly preferably 2.5 μm or less. The present invention is effective when the dielectric layers are made particularly thin.

Preferably, the ceramic grains have an average grain size of 0.3 μm or less. If the grain size is small, good reliability can be obtained, but due to the size effect of the dielectric grains, a high dielectric constant becomes difficult to obtain. Therefore, no lower limit on the grain size is particularly defined. However, to obtain a small grain size, a small sized material must be used. The smaller the material powder, the harder it becomes to handle, so usually the average grain size of the ceramic grains is given a lower limit of 0.05 μm or so.

Preferably, the dielectric layers contain magnesium (Mg) oxide as a sub ingredient. The Mg oxide is included, with respect to the barium titanate ($BaTiO_3$) or barium calcium titanate ($Ba_{1-x}Ca_xTiO_3$) as 100 mol, in an amount of 0 to 2 mol (however, excluding 0), more preferably 0 to 1 mol (however, excluding 0).

By including Mg oxide, the dielectric grains are made finer, but if the amount of addition of the sub ingredient comprised of MgO is too great, while the dielectric grains will be made finer, deterioration of the temperature characteristic, a drop in the insulation resistance, or other inconveniences will occur in some cases. Therefore, the content of MgO is preferably made smaller to a range not causing such deterioration of the various types of electrical characteristics.

Preferably, the dielectric layers contain manganese (Mn) oxide and/or chromium (Cr) oxide as a sub ingredient. The total of the Mn oxide and Cr oxide, with respect to barium titanate or barium calcium titanate as 100 mol, is 0 to 0.5 mol (however, excluding 0), more preferably, 0 to 0.4 mol (however, excluding 0).

By including Mn oxide and/or Cr oxide, there are the effect of promoting sintering, the effect of raising the IR (insulation resistance), and the effect of improving the high temperature load life, but if these contents are too great, deterioration of the temperature characteristic, a drop in the insulation resistance, or other inconveniences will occur in some cases. Therefore, the content of the Mn oxide and/or Cr is preferably made smaller to a range not causing such deterioration of the various types of electrical characteristics.

Preferably, the dielectric layers include a rare earth (R) oxide as a sub ingredient and the R oxide is included, with respect to the barium titanate or barium calcium titanate as 100 mol, in an amount of 0 to 4 mol (however, excluding 0 and 4), more preferably 0.5 to 3 mol, particularly preferably 0.5 to 2 mol.

The R is preferably one or more elements selected from Sc, Er, Tm, Yb, Lu, Y, Dy, Ho, Tb, Gd, and Eu, more preferably one or more elements selected from Y, Dy, and Ho.

By including the R oxide in a predetermined range, it is possible to control the ratio of grains having a thickness of the crystal grain boundaries of 1 nm or less and possible to obtain the actions and effects of the present invention.

Preferably, the dielectric layers include vanadium (V) oxide, tungsten (W) oxide, tantalum (Ta) oxide, and/or niobium (Nb) oxide as a sub ingredient, and the ratio of the V oxide, W oxide, Ta oxide, and Nb oxide in total with respect to the barium titanate or barium calcium titanate as 100 mol is 0 to 0.5 mol (however, excluding 0), more preferably 0 to 0.3 mol (however, excluding 0), particularly preferably 0 to 0.1 mol (however, excluding 0).

By including V oxide, W oxide, Ta oxide, and Nb oxide, there is the effect that the high temperature load life can be improved, but if the contents are too great, the temperature characteristic sometimes deteriorates, the insulation resistance drops, and other problems arise in some cases. Therefore, it is preferable to reduce the oxide contents in a range not causing deterioration of the various types of electrical characteristics.

In the first aspect of the present invention, preferably the dielectric layers include a glass ingredient. The glass ingredient is preferably ($Ba_{1-x}Ca_x$) $SiO_3$ (where x=0.3 to 0.7). In the case of this glass ingredient, the glass ingredient is included, with respect to barium titanate as 100 mol, in an amount of 0.5 to 12 mol (however, excluding 0.5), more preferably 0.5 to 6 mol (however, excluding 0.5 and 6), more preferably 1 to 4 mol.

By including the glass ingredient in a predetermined range, it is possible to control the ratio of grains having a thickness of the crystal grain boundaries of 1 nm or less or 0.75 μm or less and possible to obtain the actions and effects of the present invention.

In the second aspect of the present invention, preferably the dielectric layers include a glass ingredient. The glass ingredient is not particularly limited, but an alkali earth metal oxide, a mixture of $Li_2O_3$, $B_2O_3$, and $SiO_2$, ($Ba_{1-x}Ca_x$) $SiO_3$ (where x=0.3 to 0.7), etc. may be used.

The glass ingredient is included, with respect to the barium calcium titanate as 100 mol, in an amount of 0.5 to 12 mol (however, excluding 0.5), more preferably 0.5 to 6 mol (however, excluding 0.5 and 6), particularly preferably 1 to 5 mol.

By including the glass ingredient in a predetermined range, it is possible to control the ratio of grains having a thickness of the crystal grain boundaries of 1 nm or less or 0.75 μm or less and possible to obtain the actions and effects of the present invention.

In the present invention, the electronic device is not particularly limited. Preferably, it is a multilayer ceramic capacitor having a device body comprised of dielectric layers and internal electrode layers alternately stacked. The other electronic device is not particularly limited. A piezoelectric device, chip inductor, chip varistor, chip thermistor, chip resistor, or other surface mounted (SMD) chip type electronic device may be mentioned.

Preferably, the internal electrode layers have Ni or an Ni alloy or other base metal as their main ingredient.

According to the electronic device according to the present invention, it is possible to provide a small sized, large capacity multilayer ceramic capacitor or other electronic device superior in dielectric constant or other electrical characteristics, superior in temperature characteristic even when making the dielectric layers thin, and high in reliability.

BRIEF DESCRIPTION OF THE DRAWINGS

Below, the present invention will be explained based on embodiments shown in the drawings, wherein.

DESCRIPTION OF THE PREFERRED EMBODIMENTS

First Embodiment

Method of Production of Multilayer Ceramic Capacitor

Figure 1:
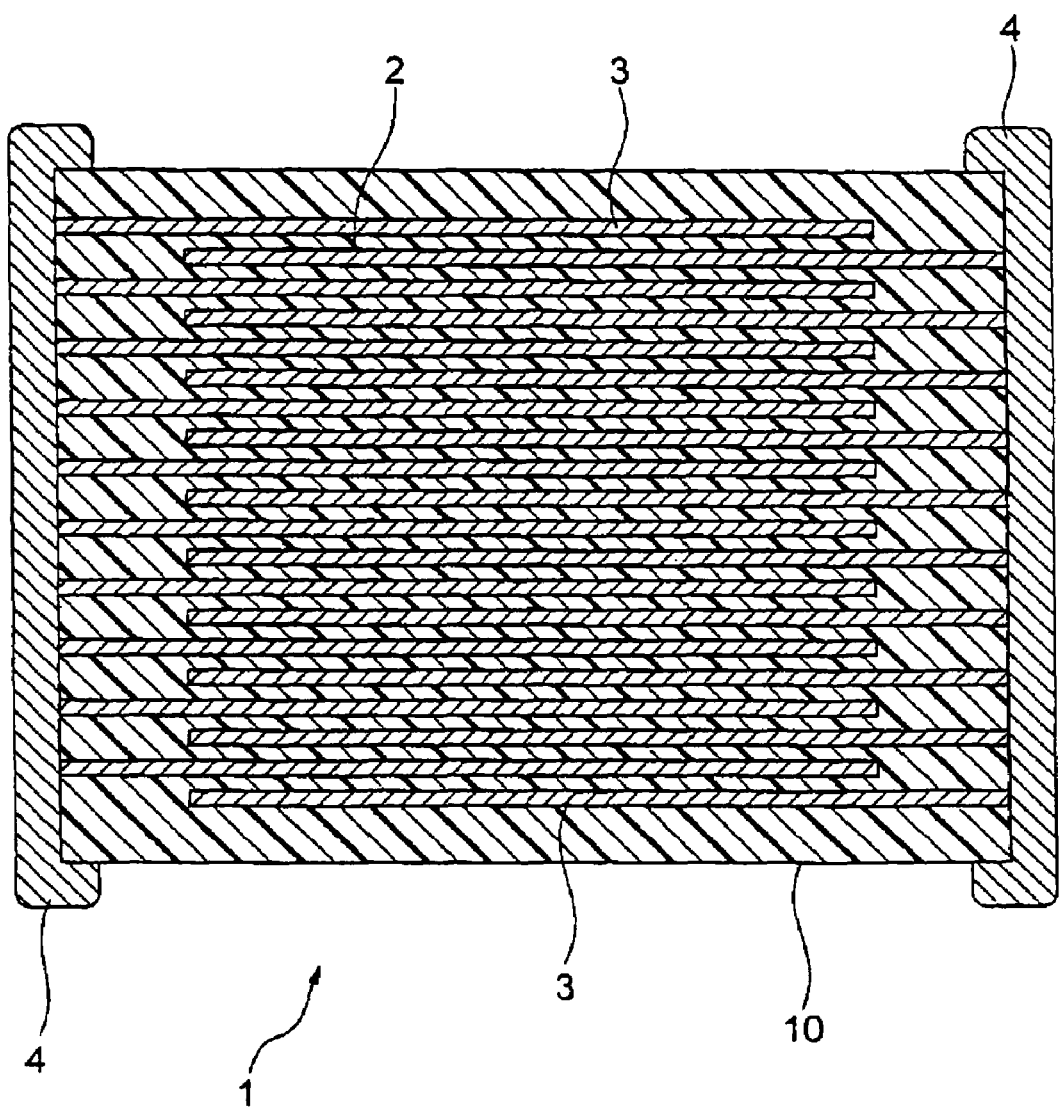
FIG. 1 is a schematic sectional view of an electronic device according to an embodiment of the present invention as constituted by a multilayer ceramic capacitor.

As shown in FIG. 1, a multilayer ceramic capacitor 1, one example of a multilayer ceramic electronic device of the present invention, has a capacitor device body 10 comprised of dielectric layers 2 and internal electrode layers 3 alternately stacked. This capacitor device body 10 is formed at its two ends with a pair of external electrodes 4 connected with the internal electrode layers 3 alternately arranged inside the device body 10. The internal electrode layers 3 are stacked so that the two end faces are alternately exposed at the surfaces of the two facing ends of the capacitor device body 10.

The pair of external electrodes 4 are formed at the two ends of the capacitor device body 10 and are connected to the exposed end faces of the alternately arranged internal electrode layers 3 to form a capacitor circuit.

The capacitor device body 10 is not particularly limited in outside shape or dimensions. These can be suitably set in accordance with the application. Normally, the outside shape is substantially a parallelepiped shape. The dimensions may usually be a length of (0.4 to 5.6 mm)×width (0.2 to 5.0 mm)×height (0.2 to 1.9 mm) or so.

The dielectric layer 2 includes barium titanate, a glass ingredient, and a sub ingredient.

Barium titanate is expressed by the formula $(BaO)_m \cdot TiO_2$. Further, the mol ratio (A/B value) m of the Ba as the A-site forming ingredient and the Ti as the B-site forming ingredient in the formula is not particularly limited, but is 0.990 to 1.035.

As the glass ingredient, in the present embodiment, the case of inclusion of a Ba oxide, Ca oxide, and Si oxide may be mentioned. Preferably, the glass ingredient is expressed by $(Ba_{1-x}Ca_x)SiO_3$ (where, x=0.3 to 0.7).

The sub ingredient, in the present embodiment, includes an Mg oxide, one or both of an Mn oxide and Cr oxide, one type or two types of oxides or more of a V oxide, W oxide, Ta oxide, and Nb oxide, and an R (where, R is one type or two types of elements or more selected from Sc, Er, Tm, Yb, Lu, Y, Dy, Ho, Tb, Gd, and Eu, preferably one type or two types of elements or more selected from Y, Dy, and Ho) oxide as an example.

Figure 2:
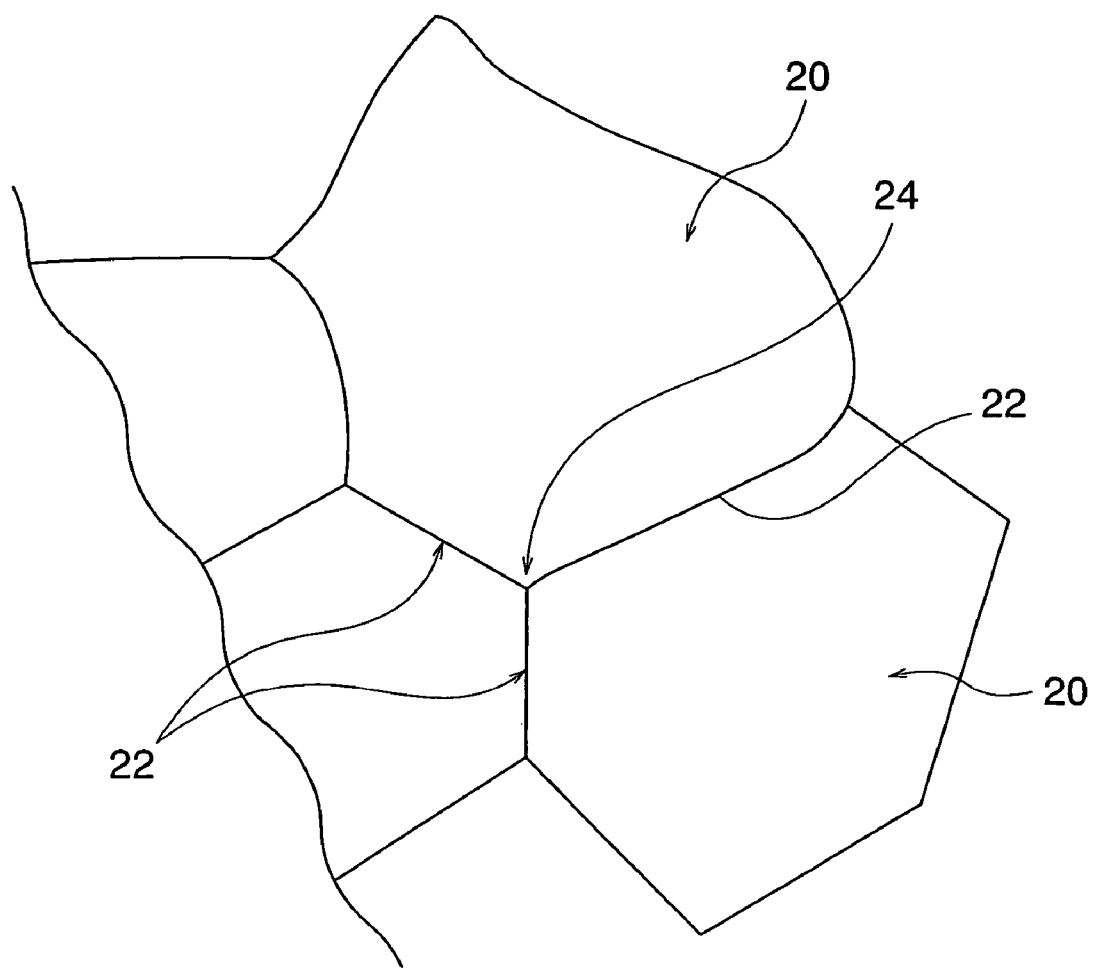
FIG. 2 is a schematic view of dielectric grains forming the dielectric layers in a multilayer ceramic capacitor.

As shown in FIG. 2, the dielectric layers 2 of the present embodiment have a plurality of dielectric grains (ceramic grains) 20. The dielectric grains 20 have an average grain size of 0.3 μm or less. By the grain size becoming smaller, a good reliability can be obtained, but due to the size effect of the dielectric grains, obtaining a high dielectric constant becomes difficult. Therefore, the lower limit of the grain size is not particularly defined. However, to obtain a small grain size, a small sized material has to be used. The smaller the material powder in size, the harder the handling, so usually the average grain size of the ceramic grains is made 0.05 μm or so as a lower limit.

There is a crystal grain boundary 22 between one dielectric grain 20 and another dielectric grain 20. In the present embodiment, the ratio of grains with a thickness of crystal grain boundaries 22 between adjoining ceramic grains of 1 nm or less is 30% to 95% of the total grains. Preferably, the ratio of grains with a thickness of crystal grain boundaries between adjoining ceramic grains of 0.75 nm or less is 40% to 90%.

If the ratio of grains with a thickness of crystal grain boundaries between adjoining ceramic grains of 1 nm or less or 0.75 nm or less is too small, the dielectric layers tend to become lower in dielectric constant and shorter in the insulation resistance lifetime. Further, if the ratio of grains with a thickness of crystal grain boundaries between adjoining ceramic grains of 1 nm or less or 0.75 nm or less is too great, the dielectric layers tend to become shorter in insulation resistance lifetime and the temperature characteristic to become worse.

Note that the ratio of grains with a thickness of crystal grain boundaries between adjoining ceramic grains of 1 nm or less or 0.75 nm or less can be measured for example as follows. That is, first, a transmission type electron microscope (TEM) is used to observe an area of 700 nm×500 nm. The thickness of the crystal grain boundaries is measured at points 100 nm apart along the crystal grain boundaries 22 observed in the field from any three-way point 24 of the crystal grain boundaries 22. This is performed for a plurality of fields. The thicknesses of the crystal grain boundaries are measured for a total of 50 points and summed up to find the ratio.

The number of the dielectric layers 2 stacked and the thickness and other various conditions may be suitably determined in accordance with the purpose or application, but in the present embodiment, the dielectric layers 2 sandwiched between pairs of internal electrode layers 3 have thicknesses of 4.5 μm or less, preferably 3.0 μm or less, more preferably 2.5 μm or less. In the present embodiment, even if the dielectric layers 2 are made thin in this way, the various types of electrical characteristics of the capacitor 1, in particular a sufficient temperature characteristic, are maintained while the CR product and the IR lifetime are improved.

The internal electrode layers 3 are substantially comprised of a conductive material of a base metal acting as an electrode. As the base material used as a conductive material, Ni or an Ni alloy is preferable. As an Ni alloy, an alloy of one type of element or more selected from Mn, Cr, Co, Cu, Al, Ru, Rh, Re, Pt, Ir, and Os and Ni is preferable. The content of Ni in the alloy is preferably 95 wt % or more. Note that the Ni or Ni alloy may also contain various types of trace ingredients of P etc. in an amount of 0.1 wt % or less. The thickness of the internal electrode layers 3 may be suitably determined in accordance with the application etc., but usually is preferably 0.05 to 3 μm, particularly 0.1 to 2.0 μm.

The external electrodes 4 are normally comprised of at least one type of Ni, Pd, Ag, Au, Cu, Pt, Rh, Ru, Ir, etc. or an alloy of the same. Normally, Cu, a Cu alloy, Ni, an Ni alloy, etc., Ag, an Ag—Pd alloy, an In—Ga alloy, etc. may be used. The external electrodes 4 may have a thickness suitably selected in accordance with the application, but usually 10 to 50 μm or so is preferable.

Method of Production of Multilayer Ceramic Capacitor

Next, an example of the method of production of a multilayer ceramic capacitor 1 according to the present embodiment will be explained.

(1) In the present embodiment, a dielectric layer paste for forming the pre-fired dielectric layers for forming the dielectric layers 2 shown in FIG. 1 after firing and an internal electrode layer paste for forming the pre-fired internal electrode layers for forming the internal electrode layers 3 shown in FIG. 1 after firing are prepared. Further, an external electrode paste is also prepared.

The dielectric layer paste is prepared by kneading a dielectric material and an organic vehicle.

(1-1) The dielectric material used in the present embodiment includes the different materials forming the above dielectric ceramic composition in predetermined ratios. First, the barium titanate material, glass ingredient material, and sub ingredient material forming the above materials are prepared.

Barium Titanate Material

As the barium titanate material forming the main ingredient of the dielectric layers, one of the formula $(BaO)_m TiO_2$ is used. The barium titanate material used in the present invention can be obtained by not only the so-called solid phase method, but also the so-called liquid phase method. The solid phase method (calcining method) is the method of obtaining the material by weighing and mixing $BaCO_3$ and $TiO_2$ in predetermined amounts and calcining and crushing the result when using these as starting materials. As the liquid phase method, the oxalate method, hydrothermal synthesis method, alkoxide method, sol gel method, etc. may be mentioned.

Glass Ingredient Material

As the glass ingredient material, one including a Ba compound, Ca compound, and Si compound is used. The Si compound in the glass ingredient material acts as a sintering aid, while the Ca compound and Ba compound have the effect of improving the temperature characteristic of the electrostatic capacity (rate of change of electrostatic capacity with respect to temperature).

The glass ingredient material used in the present embodiment may be one in the form of a mixture or in the form of a complex oxide. However, in the present embodiment, use in the form of a complex oxide which has a lower melting point than the form of a mixture is preferable.

As the form of the mixture, a Ca compound ($CaO$, $CaCO_3$, etc.)+Si compound ($SiO_2$ etc.)+Ba compound ($BaO$, $BaCO_3$, etc.) etc. may be mentioned. As the form of the complex oxide, $(Ba_{1-x}Ca_x) SiO_3$ etc. may be mentioned. In the formula, x is preferably 0.3 to 0.7, more preferably 0.35 to 0.50. If x is too small, the temperature characteristic tends to deteriorate, while if x is too large, the dielectric constant tends to fall.

Sub Ingredient Material

In the present embodiment, as the sub ingredient material, a mixture of an Mg compound, one or both of an Mn compound and Cr compound, one or more compounds selected from a V compound, W compound, Ta compound, and Nb compound, and a compound of R (where, R is one or more elements selected from Sc, Er, Tm, Yb, Lu, Y, Dy, Ho, Tb, Gd, and Eu, preferably one or more elements selected from Y, Dy, and Ho) is used.

An Mg compound has the effect of flattening the capacity-temperature characteristic and the effect of suppressing grain growth. An Mn compound and Cr compound have the effect of promoting sintering, the effect of raising the IR (insulation resistance), and the effect of improving the high temperature load life. A V compound, W compound, Ta compound, and Nb compound have the effect of improving the high temperature load life. An R compound mainly has the effect of improving the high temperature load life.

Note that an Mg compound means magnesium oxide and/or a compound giving magnesium oxide after firing, an Mn compound means magnesium oxide and/or a compound giving magnesium oxide after firing, and a Cr compound means chromium oxide and/or a compound giving chromium oxide after firing.

A V compound means vanadium oxide and/or a compound giving vanadium oxide after firing, a W compound means tungsten oxide and/or a compound giving tungsten oxide after firing, a Ta compound means tantalum oxide and/or a compound giving tantalum oxide after firing, and an Nb compound means niobium oxide and/or a compound giving niobium oxide after firing. An R compound means an R oxide and/or a compound giving an R oxide after firing.

(1-2) Next, the barium titanate material, glass ingredient material, and sub ingredient material are mixed to obtain the final composition.

The amount of mixture (ratio) of the glass ingredient material with respect to the barium titanate material as 100 mol is as follows. When converting the Ba compound to BaO, the Ca compound to CaO, and the Si compound to $SiO_2$, preferably, Ba compound+Ca compound: 0.5 to 12 mol (however, excluding 0.5), and Si compound: 0.5 to 12 mol (however, excluding 0.5), more preferably, Ba compound+Ca compound: 0.5 to 6 mol (however, excluding 0.5 and 6), and Si compound: 0.5 to 6 mol (however, excluding 0.5 and 6). If the Ba compound, Ca compound, and Si compound are too small in amount of addition, densification at a relatively low temperature is difficult and further the temperature characteristic is adversely affected in some cases.

Further, in the present invention, by including the glass ingredient in a predetermined range, it is possible to control the ratio of grains having a thickness of the crystal grain boundaries of 1 nm or less or 0.75 nm or less.

The amount of mixture (ratio) of the sub ingredient material with respect to the barium titanate material as 100 mol is as follows.

When converting the Mg compound to MgO, the Mn compound to MnO, the Cr compound to $Cr_2O_3$, the V compound to $V_2O_5$, the W compound to $WO_3$, the Ta compound to $Ta_2O_5$, the Nb compound to $Nb_2O_5$, and the R compound to $R_2O_3$, preferably, Mg compound: 0 to 2 mol (however, excluding 0 mol), Mn compound+Cr compound: 0 to 0.5 mol (however, excluding 0 mol), V compound+W compound+Ta compound+Nb compound: 0 to 0.5 mol (however, excluding 0 mol), and R compound: 0 to 4 mol (however, excluding 0 mol and 4 mol), more preferably, Mg compound: 0 to 1 mol (however, excluding 0 mol), Mn compound+Cr compound: 0 to 0.4 mol (however, excluding 0 mol), V compound+W compound+Ta compound+Nb compound: 0.01 to 0.1 mol, and R compound: 0.5 to 3.5 mol.

If the amount of addition of the Mg compound is too small, abnormal grain growth tends to occur, while if too large, the relative dielectric constant tends to fall. If the total amount of addition of the Mn compound and Cr compound is too great, the relative dielectric constant tends to fall. If the total amount of addition of the V compound, W compound, Ta compound, and Nb compound is too great, the IR tends to remarkably fall. If the amount of addition of the R compound is too large, the sinterability tends to deteriorate.

Then, this mixed powder may, in accordance with need, be mixed by a ball mill etc. together with pure water or another dispersion medium and dried to obtain the dielectric material.

Note that as the dielectric material comprised of the above ingredient, the above-mentioned oxides or their mixtures and complex oxides may be used, but in addition various types of compounds giving the above oxides or complex oxides by firing, for example, carbonates, oxalates, nitrates, hydroxides, organometallic compounds, etc. may be suitably selected and mixed for use.

Note that the contents of the different materials in the compounds of the dielectric material may be suitably selected so as to give the above dielectric ceramic composition after firing.

In the state before coating, the dielectric material has an average grain size of preferably 0.3 μm or less, more preferably 0.05 to 0.26 μm or so.

The organic vehicle contains a binder and solvent. As the binder, for example, ethyl cellulose, polyvinyl butyral, acryl resin, or other usual types of binder may be used. The solvent is also not particularly limited, but terpineol, butyl carbitol, acetone, toluene, xylene, ethanol, or another organic solvent may be used.

The dielectric layer paste can be formed by kneading a dielectric material and a vehicle comprised of water in which a water-soluble binder is dissolved. The water-soluble binder is not particularly limited, but a polyvinyl alcohol, methyl cellulose, hydroxyethyl cellulose, water-soluble acryl resin, emulsion, etc. may be used.

The internal electrode layer paste is prepared by kneading the above various types of conductive metals or alloys forming the conductive material or the various types of oxides, organometallic compounds, resinates, etc. forming the conductive material after firing and the above organic vehicle. The external electrode paste is also prepared in the same way as this internal electrode layer paste.

The content of the organic vehicle of each paste is not particularly limited, but the usual content should be, for example, a binder of about 1 to 5 wt % and a solvent of about 10 to 50 wt %. Further, each paste may contain in accordance with need various types of additives selected from dispersants, plasticizers, dielectrics, insulators, etc.

(2) Next, the dielectric layer paste containing the dielectric material and the internal electrode layer paste are used to prepare a green chip comprised of pre-fired dielectric layers and pre-fired internal electrode layers. After this, the chip is treated by a step to remove the binder, a firing step, and, in accordance with need, an annealing step to obtain a capacitor device body 10. Next, this device body 10 is printed with or transferred with the external electrode paste which is then fired to form the external electrodes 4. Due to this, a multilayer ceramic capacitor 1 is obtained.

Second Embodiment

The second embodiment is a modification of the above first embodiment. Only the material of the dielectric layers 2 differs. The rest of the configuration and the actions and effects are similar to the first embodiment. Below, only the different parts will be explained. Explanations of the common parts will be omitted.

In the present embodiment, the dielectric layers 2 include barium calcium titanate expressed by $Ba_{1-x}Ca_xTiO_3$ ($0.001 \leq x \leq 0.15$), a glass ingredient, and a sub ingredient. Barium calcium titanate is a compound comprised of barium titanate expressed by the formula $(BaO)_mTiO_2$ wherein part of the Ba of the A-site forming parts is substituted by Ca. If the value of x in the barium calcium titanate is too small, the temperature characteristic tends to deteriorate, while if too large, the dielectric constant tends to decline.

The glass ingredient in the present embodiment is not particularly limited. An alkali earth metal oxide, a mixture of $Li_2O_3$, $B_2O_3$, and $SiO_2$, or $(Ba_{1-x}Ca_x)SiO_3$ (where, x=0.3 to 0.7) etc. may be used.

In the present embodiment, there is a crystal grain boundary 22 between one dielectric grain 20 and another dielectric grain 20. The ratio of grains with a thickness of crystal grain boundaries 22 between adjoining ceramic grains of 1 nm or less is 20% to 70% of the total grains. Preferably, the ratio of grains with a thickness of crystal grain boundarie between adjoining ceramic grains of 0.75 nm or less is 25% to 65% of the total grains.

If the ratio of grains having a thickness of the crystal grain boundaries of 1 nm or less or 0.75 nm or less is too small, the dielectric layers tend to become lower in dielectric constant. Further, if the ratio of grains having a thickness of the crystal grain boundaries of 1 nm or less or 0.75 nm or less is too great, the dielectric layers tend to become shorter in insulation resistance lifetime.

As the barium titanate material forming the main ingredient of the dielectric layers, one expressed by the formula $Ba_{1-x}Ca_xTiO_3$ ($0.001 \leq x \leq 0.15$) is used. The barium titanate material used in the present invention can be obtained by not only the so-called solid phase method, but also the so-called liquid phase method. The solid phase method (calcining method) is the method of obtaining the material by weighing and mixing $BaCO_3$, $CaCO_3$ and $TiO_2$ in predetermined amounts and calcining and crushing the result when using these as starting materials. As the liquid phase method, the oxalate method, hydrothermal synthesis method, alkoxide method, sol gel method, etc. may be mentioned.

The glass ingredient material is not particularly limited. An alkali earth metal oxide, a mixture of $Li_2O_3$, $B_2O_3$, and $SiO_2$, $(Ba_{1-x}Ca_x)SiO_3$ (where x=0.3 to 0.7), etc. may be used.

The glass ingredient material used in the present embodiment may be in the form of a mixture. Alternatively, it may be used in the form of a complex oxide. However, in the present embodiment, use in the form of a complex oxide where the melting point becomes lower rather than the form of a mixture is preferable.

As the form of the mixture, a Ca compound (CaO, $CaCO_3$, etc.)+Si compound ($SiO_2$ etc.)+Ba compound (BaO, $BaCO_3$, etc.) etc. may be mentioned. As the form of the complex oxide, $(Ba_{1-x}Ca_x)SiO_3$ etc. may be mentioned. In the formula, x is preferably 0.3 to 0.7, more preferably 0.35 to 0.50. If x is too small, the temperature characteristic tends to deteriorate, while if x is too large, the dielectric constant tends to fall.

The amount of mixture (ratio) of the glass ingredient material with respect to the barium calcium titanate material as 100 mol is as follows. That is, the glass ingredient is contained in an amount of 0.5 to 12 mol (however, excluding 0.5), more preferably 0.5 to 6 mol (however, excluding 0.5 and 6), particularly preferably 1 to 5 mol. If the glass ingredient is too small in amount of addition, densification at a relatively low temperature is difficult and further the temperature characteristic is adversely affected in some cases.

Further, in the present invention, by including the glass ingredient in a predetermined range, it is possible to control the ratio of grains having a thickness of the crystal grain boundaries of 1 nm or less or 0.75 nm or less.

The amount of mixture (ratio) of the sub ingredient material with respect to the barium calcium titanate material as 100 mol is as follows.

When converting the Mg compound to MgO, the Mn compound to MnO, the Cr compound to $Cr_2O_3$, the V compound to $V_2O_5$, the W compound to $WO_3$, the Ta compound to $Ta_2O_5$, the Nb compound to $Nb_2O_5$, and the R compound to $R_2O_3$, preferably, Mg compound: 0 to 2 mol (however, excluding 0 mol), Mn compound+Cr compound: 0 to 0.5 mol (however, excluding 0 mol), V compound+W compound+Ta compound+Nb compound: 0 to 0.5 mol (however, excluding 0 mol), R compound: 0 to 4 mol (however, excluding 0 mol and 4 mol), more preferably, Mg compound: 0 to 1 mol (however, excluding 0 mol), Mn compound+Cr compound: 0 to 0.4 mol (however, excluding 0 mol), V compound+W compound+Ta compound+Nb compound: 0.01 to 0.1 mol, and R compound: 0.5 to 3.5 mol.

If the amount of addition of the Mg compound is too small, abnormal grain growth tends to occur, while if too large, the relative dielectric constant tends to fall. If the total amount of addition of the Mn compound and the Cr compound is too great, the relative dielectric constant tends to fall. If the total amount of addition of the V compound, W compound, Ta compound and Nb compound is too great, the IR tends to remarkably fall. If the amount of addition of the R compound is too large, the sinterability tends to deteriorate.

Note that the present invention is not limited to the above-mentioned embodiments and can be modified in various ways within the scope of the present invention. For example, in the above-mentioned embodiments, as the electronic device according to the present invention, a multilayer ceramic capacitor was illustrated, but the electronic device according to the present invention is not limited to a multilayer ceramic capacitor and may be any device having dielectric layers formed by the above composition of the dielectric ceramic composition.

EXAMPLES

Next, the present invention will be explained based on further detailed examples, but the present invention is not limited to these examples.

Example 1

Preparation of Dielectric Material

First, the barium titanate material, glass ingredient material, and sub ingredient material were prepared. As the barium titanate material, $(BaO)_m \cdot TiO_2$ (where, m=1.005) one having a specific surface area (SSA) of 6 $m^2/g$ was used. The barium titanate material was produced by preparing 1.000 mol of $TiO_2$ with respect to 1.005 mol of $BaCO_3$, wet mixing these by a ball mill for 16 hours, drying the mixture, then firing it at 800° C. in the air, then further wet pulverizing it by a ball mill for 100 hours. Note that the SSA is a value measured by the nitrogen absorption method, while m is found by the glass bead method.

As the glass ingredient material, a complex oxide constituted by $(Ba_{0.6}Ca_{0.4})SiO_3$ (below, called "BCG") obtained by wet mixing $BaCO_3$, $CaCO_3$, and $SiO_2$ in a predetermined ratio by a ball mill for 16 hours, drying the mixture, then firing it at 1150° C. in the air and further wet pulverizing the result by a ball mill for 100 hours is used.

As the sub ingredient material, MgO, MnO (or $Cr_2O_3$), $Y_2O_3$, and $V_2O_5$ having an average grain size of 0.01 to 0.1 μm were used.

Next, to 100 mol of barium titanate material, a glass ingredient material constituted by BCG and a sub ingredient material constituted by MgO, MnO (or $Cr_2O_3$), $Y_2O_3$, and $V_2O_5$ were added and wet mixed (wet pulverized) using water as a solvent by a ball mill for 16 hours. After this, the mixture was dried at 130° C. by hot air to obtain a dielectric material.

The dielectric material contained, with respect to 100 mol of the barium titanate material, BCG: 3 mol, $Y_2O_3$: 0 to 4 mol (see samples 1 to 8 of Table 1), MgO: 0.5 mol, MnO: 0.2 mol (or $Cr_2O_3$: 0.2 mol), and $V_2O_5$: 0.03 mol.

TABLE 1

| Sample no. | MgO | MnO | Cr2O3 | Y2O3 | Dy2O3 | Ho2O3 | V2O5 | mol % BCG |
|---|---|---|---|---|---|---|---|---|
| *1 | 0.5 | 0.2 | 0 | 0 | 0 | 0 | 0.03 | 3 |
| 2 | 0.5 | 0.2 | 0 | 0.5 | 0 | 0 | 0.03 | 3 |
| 3 | 0.5 | 0.2 | 0 | 1 | 0 | 0 | 0.03 | 3 |
| 4 | 0.5 | 0 | 0.2 | 1 | 0 | 0 | 0.03 | 3 |
| 5 | 0.5 | 0.2 | 0 | 2 | 0 | 0 | 0.03 | 3 |
| 6 | 0.5 | 0 | 0.2 | 2 | 0 | 0 | 0.03 | 3 |
| **7 | 0.5 | 0.2 | 0 | 3 | 0 | 0 | 0.03 | 3 |
| *8 | 0.5 | 0.2 | 0 | 4 | 0 | 0 | 0.03 | 3 |
| 9 | 0.5 | 0.2 | 0 | 0 | 1 | 0 | 0.03 | 3 |
| 10 | 0.5 | 0.2 | 0 | 0 | 0 | 1 | 0.03 | 3 |
| *11 | 0.5 | 0.2 | 0 | 2 | 0 | 0 | 0.03 | 0.5 |
| 12 | 0.5 | 0.2 | 0 | 2 | 0 | 0 | 0.03 | 1 |
| 13 | 0.5 | 0.2 | 0 | 2 | 0 | 0 | 0.03 | 2 |
| 14 | 0.5 | 0.2 | 0 | 2 | 0 | 0 | 0.03 | 4 |
| 15 | 0.5 | 0.2 | 0 | 2 | 0 | 0 | 0.03 | 5 |
| *16 | 0.5 | 0.2 | 0 | 2 | 0 | 0 | 0.03 | 6 |

*Comp. Ex.
**Ref. Ex.

Next, a polyvinyl butyral resin and ethanol-based organic solvent were added to the obtained dielectric material. The result was mixed again by a ball mill to a paste so as to obtain a dielectric layer paste.

Next, Ni particles in an amount of 44.6 parts by weight, terpineol in 52 parts by weight, ethyl cellulose in 3 parts by weight, and benzotriazole in 0.4 part by weight were kneaded by a triple roll to a slurry so as to obtain an internal electrode paste.

Preparation of Sintered Body

The obtained dielectric layer paste was used by the doctor blade method to form a green sheet on a PET film. This was printed on by the internal electrode paste by the screen printing method. Around this time, pieces of the protective green sheet not printed with internal electrode paste were peeled off the PET film and stacked in a plurality of layers to a thickness of about 300 μm. Pieces of the sheet on which the internal electrode paste was printed were peeled off from the PET film and stacked over this in a desired number of layers (in this case, five), then again the protective green sheets were stacked. The result was press bonded to obtain a green chip. Note that the pre-fired dielectric layers had a thickness of 3 μm.

Next, the green chip was cut to a predetermined size and treated to remove the binder, fired, and annealed under the following conditions to obtain a chip sintered body. The conditions of the treatment to remove the binder were: rate of temperature rise: 32.5° C./hour, holding temperature: 260° C., temperature holding time: 8 hours, atmosphere: air. The firing condtions were: rate of temperature rise: 200° C./hour, holding temperature: 1200° C. or so (1180 to 1280° C./see Table 2), temperature holding time: 2 hours, cooling rate: 200° C./hour, atmosphere gas: wet $N_2+H_2$ mixed gas. The annealing conditions were: rate of temperature rise: 200° C./hour, holding temperature: 1050° C., temperature holding time: 2 hours, cooling rate: 200° C./hour, atmosphere gas: wet $N_2$ gas. Note that the atmosphere gas at the time of firing and annealing was wetted using a wetter having a water temperature of 20° C.

The obtained sintered body had a size of 3.2 mm×1.6 mm×0.6 mm. Four dielectric layers were sandwiched between internal electrode layers.

Preparation of Capacitor Samples and Evaluation of Characteristics

The obtained chip sintered body was polished at its end faces by sand blasting, then was coated with external electrodes comprised of In—Ga to obtain a sample of the multilayer ceramic capacitor shown in FIG. 1.

Each obtained capacitor sample was measured for relative dielectric constant ∈, the temperature characteristic (TC) of the electrostatic capacity, and the high temperature load life (IR life/in table, just indicated as "life"). The results are shown in Table 2.

For the relative dielectric constant ∈, the electrostatic capacity C was measured for each capacitor sample at a reference temperature of 20° C. by a digital LCR meter (Yokogawa Electric YHP4284) under conditions of a frequency of 1 kHz and an input signal level (measurement voltage) of 1.0 Vrms/μm. In this example, a relative dielectric constant of 2500 or more is preferable, and 2700 or more is more preferable.

For the temperature characteristic (TC) of the electrostatic capacity, the EIA X5R characteristic was evaluated. That is, each capacitor sample was measured for the electrostatic capacity by a digital LCR meter (YHP Model 4274A) under conditions of a frequency of 1 kHz and an input signal level (measurement voltage) of 1 Vrms. Whether the rate of change of the electrostatic capacity with respect to the temperature (ΔC/C) satisfied the X5R characteristic (±15% or less) at −55 to 85° C. in temperature when the reference temperature was made 25° C. was investigated. If satisfied, the rate was judged as "good", while if not satisfied, it was judged as "poor"

For the high temperature load life, each capacitor sample was supplied with a 40V DC voltage at 150° C. and that state held so as to measure the high temperature load life. This high temperature load life is particularly important when making the dielectric layers thin. In this example, the time from the start of application to when the resistance falls by one order of magnitude is defined as the "lifetime". This was performed for 10 capacitor samples and the average lifetime was calculated. In this example, an IR lifetime of 100 hours or more is preferable, while 110 hours or more is more preferable. The results are shown in Table 2.

TABLE 2

| Sample no. | Firing temp. (° C.) | Dielectric constant | Life (h) | X5R char. | Ratio having crystal grain boundaries of 1 nm or less | Ratio having crystal grain boundaries of 0.7 nm or less |
|---|---|---|---|---|---|---|
| *1 | 1180 | 3410 | 20 | Poor | 98 | 94 |
| 2 | 1200 | 3130 | 110 | Good | 94 | 88 |
| 3 | 1220 | 2790 | 250 | Good | 74 | 70 |
| 4 | 1220 | 2830 | 200 | Good | 82 | 66 |
| 5 | 1240 | 2740 | 270 | Good | 58 | 48 |
| 6 | 1240 | 2700 | 260 | Good | 44 | 40 |
| **7 | 1260 | 2440 | 280 | Good | 38 | 34 |
| *8 | ≧1280 | Insuf. Firing | | | 28 | 16 |
| 9 | 1220 | 2710 | 230 | Good | 56 | 52 |
| 10 | 1220 | 2720 | 220 | Good | 64 | 52 |
| *11 | ≧1280 | Insuf. Firing | | | 20 | 10 |
| 12 | 1260 | 2820 | 140 | Good | 90 | 80 |
| 13 | 1200 | 2760 | 160 | Good | 78 | 68 |
| 14 | 1200 | 2640 | 180 | Good | 62 | 50 |
| 15 | 1180 | 2550 | 150 | Good | 32 | 26 |
| *16 | 1180 | 2400 | 120 | Poor | 24 | 8 |

*Comp. Ex.
**Ref. Ex.

Thickness of Dielectric Layers

The obtained sintered body was cut at a plane perpendicular to the internal electrodes, the cut surface was polished, then a plurality of locations of the polished surface were observed by a metal microscope. Next, the image observed by the metal microscope was digitally processed to find the average thickness of the dielectric layers after sintering. The dielectric layers of each sample had an average thickness of 2.5 μm.

Average Grain Size of Dielectric Grains in Dielectric Layers

The obtained sintered body was polished and chemically etched, then was observed under a scan type electron microscope (SEM). The cord method was used, while assuming the shapes of the dielectric grains 20 in the dielectric layers to be spheres, to measure the dielectric grains for average grain size. The average grain size was the average for 250 measurement points. The average grain size was 0.20 to 0.26 μm.

Thickness of Crystal Grain Boundaries of Dielectric Grains in Dielectric Layer The obtained sintered body was mechanically polished and ion milled, then was measured for the thickness of the crystal grain boundaries by a transmission type electron microscope (TEM) as follows:

The TEM was used to observe an area of 700 nm×500 nm. The thickness of the crystal grain boundaries 22 was measured at points 100 nm apart along the crystal grain boundaries 22 observed in the field from any three-way point 24 of the crystal grain boundaries 22. This was performed for a plurality of fields. The thicknesses of the crystal grain boundaries 22 were measured for a total of 50 points. From the measurement results, the ratio (%) of pairs of grains with a thickness of the crystal grain boundaries 22 of 1 nm or less and the ratio (%) of pairs of grains with a thickness of the crystal grain boundaries of 0.7 nm or less were calculated for each sample. The results are shown in Table 2.

Figure 3A:
FIG. 3A is a TEM photograph of dielectric grains forming the dielectric layers in a multilayer ceramic capacitor according to an example of the present invention.
Figure 3B:
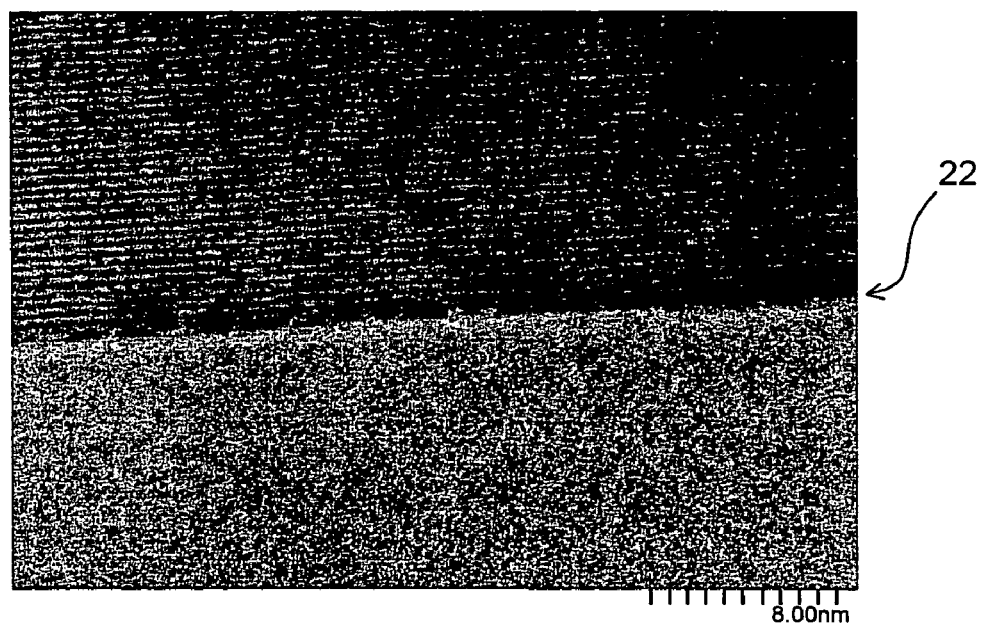
FIG. 3B is an enlarged photograph of a crystal grain boundary shown in FIG. 3A.
Figure 4A:
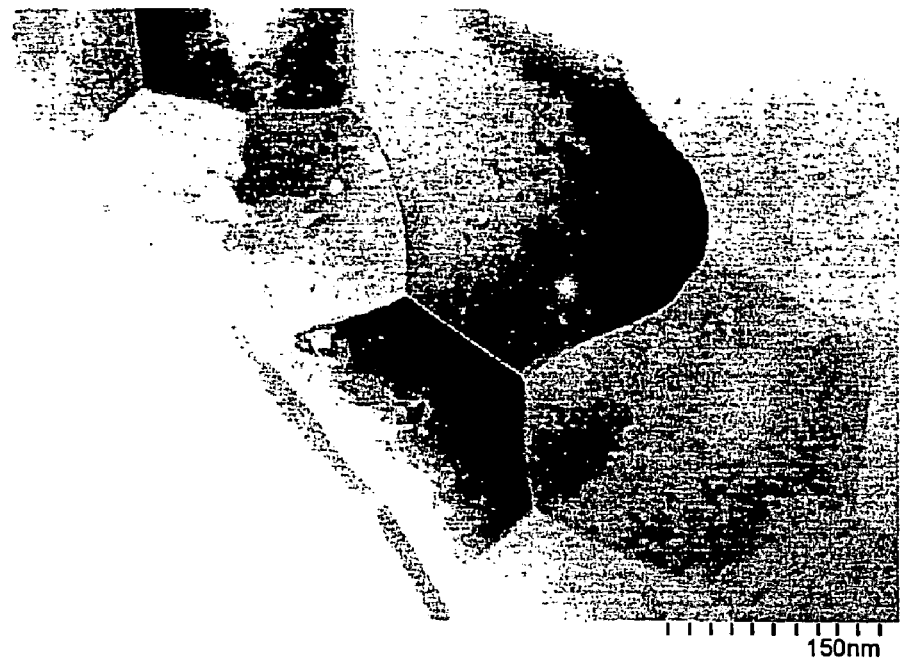
FIG. 4A is a TEM photograph of dielectric grains forming the dielectric layers in a multilayer ceramic capacitor according to a comparative example of the present invention.
Figure 4B:
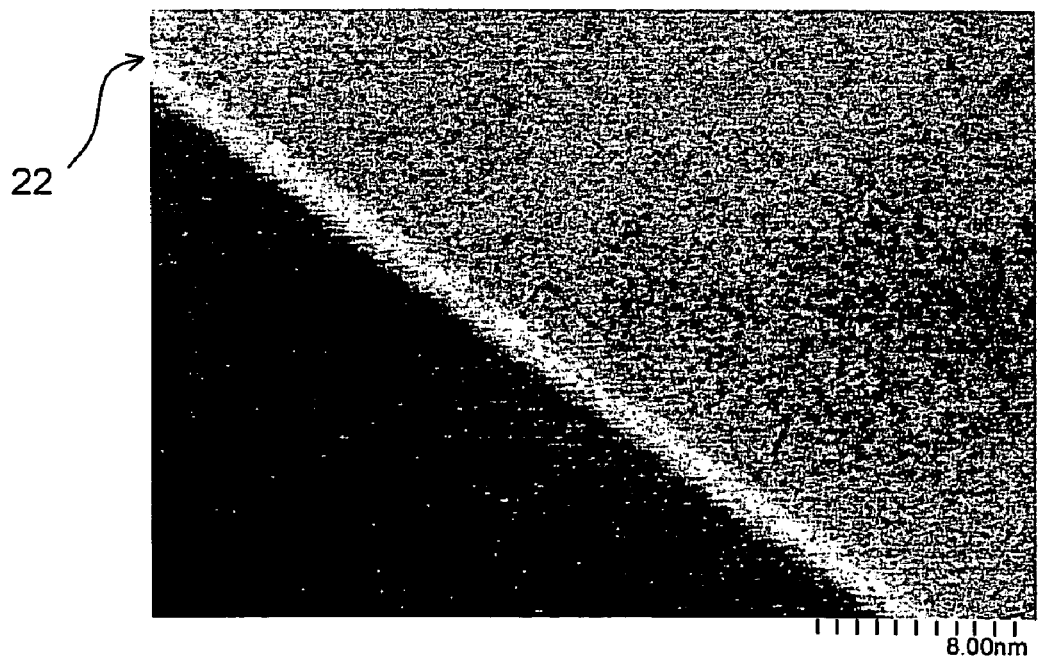
FIG. 4B is an enlarged photograph of a crystal grain boundary shown in FIG. 4A.

Note that a TEM photograph of an example of the invention, that is, sample no. 3, in Table 1 and Table 2 is shown in FIG. 3A, while its enlarged photograph is shown in FIG. 3B. Further, a TEM photograph of a comparative example, that is, sample no. 8, is shown in FIG. 4A, while its enlarged photograph is shown in FIG. 4B.

Evaluation 1

As shown by sample nos. 1 to 8 of Table 2, it was confirmed that in a multilayer ceramic capacitor where the ratio of pairs of grains having a thickness of the crystal grain boundaries of 1 nm or less is 30% to 95% of the total grains, the EIA X5R characteristic is satisfied and a high dielectric constant and high reliability are exhibited. Further, more preferably, it was learned that in a multilayer ceramic capacitor where the ratio of pairs of grains having a thickness of the crystal grain boundaries of 0.7 nm or less is 40% to 90% of the total grains, similarly the EIA X5R characteristic is satisfied and a high dielectric constant and high reliability (high lifetime) are exhibited.

When comparing the dielectric part such as the core and the grain boundary part, generally the insulation resistance is higher at the grain boundary part. Therefore, the greater the ratio of the grain boundaries having a thickness of 1 nm or more, the higher the reliability probably becomes. However, on the other hand, when similarly comparing the dielectric part and grain boundary part, generally the dielectric constant is higher at the dielectric part. Therefore, the smaller the ratio of the grain boundaries having a thickness of 1 nm or less, the higher the multilayer ceramic capacitor probably becomes in dielectric constant. To obtain preferable values in both the reliability and dielectric constant, the ratio of grain boundaries having a thickness of 1 nm or less (preferably 0.7 nm or less) is probably in the above-mentioned range.

Note that it was confirmed that the ratio of pairs of grains having a thickness of the crystal grain boundaries of 1 nm or less (or 0.7 nm or less) changes in accordance with the amount of addition of $Y_2O_3$. As shown in the other later explained examples, the ratio changes by methods other than the amount of addition of $Y_2O_3$ as well.

Example 2

Except for adding, instead of $Y_2O_3$, $Dy_2O_3$ or $Ho_2O_3$ in the amounts of addition of 1 mol with respect to 100 mol of the barium titanate material as shown by sample nos. 9 and 10 of Table 1, the same procedure was followed as in sample no. 3 of Example 1 to prepare sintered body samples and capacitor samples which were evaluated in the same way. As shown in Table 2, trends similar to Example 1 were confirmed. From this example, it is believed that even if replacing Y with other rare earths (Sc, Er, Tm, Yb, Lu, Tb, Gd, and Eu), similar effects are obtained.

Example 3

Except for changing the amount of addition of the BCG to 0.5 to 6 mol in range as shown by sample nos. 11 to 16 of Table 1, the same procedure was followed as in sample no. 5 of Example 1 to prepare sintered body samples and capacitor samples which were evaluated in the same way. As shown in Table 2, trends similar to Example 1 were confirmed. That is, it was confirmed that in a multilayer ceramic capacitor where the ratio of pairs of grains having a thickness of the crystal grain boundaries of 1 nm or less is 30% to 95% of the total grains, the EIA X5R characteristic is satisfied and a high dielectric constant and high reliability are exhibited. Further, more preferably, it was confirmed that in a multilayer ceramic capacitor where the ratio of pairs of grains having a thickness of the crystal grain boundaries of 0.7 nm or less is 40% to 90% of the total grains, similarly the EIA X5R characteristic is satisfied and a high dielectric constant and high reliability (high lifetime) are exhibited.

Further, it was confirmed that even by changing the amount of addition of the BCG or other glass ingredient or the amount of Mg, the ratio of pairs of grains having a thickness of the crystal grain boundaries of 1 nm or less (or 0.7 nm or less) changed.

Example 4

Except for changing the firing temperature to 1180° C. to 1260° C. as shown by sample nos. 3a to 3e of Table 3, the same procedure was followed as in sample no. 3 of Example 1 to prepare sintered body samples and capacitor samples which were evaluated in the same way. As shown in Table 3, trends similar to Example 1 were confirmed. That is, it was confirmed that in a multilayer ceramic capacitor where the ratio of pairs of grains having a thickness of the crystal grain boundaries of 1 nm or less is 30% to 95% of the total grains, the EIA X5R characteristic is satisfied and a high dielectric constant and high reliability are exhibited. Further, more preferably, it was confirmed that in a multilayer ceramic capacitor where the ratio of pairs of grains having a thickness of the crystal grain boundaries of 0.7 nm or less is 40% to 90% of the total grains, similarly the EIA X5R characteristic is satisfied and a high dielectric constant and high reliability (high lifetime) are exhibited.

Further, it was confirmed that even by changing the firing temperature, the ratio of pairs of grains having a thickness of the crystal grain boundaries of 1 nm or less (or 0.7 nm or less) changed.

Example 1 to prepare sintered body samples and capacitor samples which were evaluated in the same way. Below, only parts different from Example 1 will be explained in detail. Explanations of common parts will be partially omitted.

The dielectric material was prepared as follows. First, the barium calcium titanate material, glass ingredient material, and sub ingredient material were prepared. As the barium calcium titanate material, $Ba_{1-x}Ca_xTiO_3$ ($0.001 \leqq x \leqq 0.15$) synthesized by the liquid phase method was used.

TABLE 3

| Sample no. | Firing temp. (° C.) | Dielectric constant | Lifetime (h) | X5R char. | Ratio having crystal grain boundaries of 1 nm or less | Ratio having crystal grain boundaries of 0.7 nm or less |
|---|---|---|---|---|---|---|
| *3a | 1180 | 2120 | 50 | ○ | 24 | 18 |
| **3b | 1200 | 2640 | 140 | ○ | 40 | 34 |
| 3c | 1220 | 2790 | 250 | ○ | 74 | 70 |
| 3d | 1240 | 2740 | 160 | ○ | 52 | 50 |
| *3e | 1260 | 2650 | 90 | ○ | 24 | 20 |
| *9a | 1180 | 1990 | 10 | ○ | 12 | 8 |
| **9b | 1200 | 2520 | 110 | ○ | 44 | 30 |
| 9c | 1220 | 2710 | 230 | ○ | 56 | 52 |
| **9d | 1240 | 2690 | 180 | ○ | 42 | 38 |
| *9e | 1260 | 2550 | 50 | ○ | 18 | 6 |
| *10a | 1180 | 2080 | 40 | ○ | 10 | 16 |
| *10b | 1200 | 2480 | 90 | ○ | 28 | 26 |
| 10c | 1220 | 2720 | 220 | ○ | 64 | 52 |
| **10d | 1240 | 2680 | 170 | ○ | 50 | 36 |
| *10e | 1260 | 2590 | 60 | ○ | 26 | 4 |

*Comp. Ex.
**Ref. Ex.

Example 5

Except for changing the firing temperature to 1180° C. to 1260° C. as shown by sample nos. 9a to 9e of Table 3, the same procedure was followed as in sample no. 9 of Example 1 to prepare sintered body samples and capacitor samples which were evaluated in the same way. As shown in Table 3, trends similar to Example 4 were confirmed.

Example 6

Except for changing the firing temperature to 1180° C. to 1260° C. as shown by sample nos. 10a to 10e of Table 3, the same procedure was followed as in sample no. 10 of Example 1 to prepare sintered body samples and capacitor samples which were evaluated in the same way. As shown in Table 3, trends similar to Example 4 were confirmed.

Example 7

Except for replacing the barium titanate with barium calcium titanate, the same procedure was followed as in As the glass ingredient material, BaO in an amount of 10 mol %, $SiO_2$ in 60 mol %, $TiO_2$ in 10 mol %, and $Li_2O_3$ in 20 mol % were mixed and calcined.

As the sub ingredient material, MgO, MnO (or $Cr_2O_3$), $Y_2O_3$, and $V_2O_5$ with an average grain size of 0.01 to 0.1 μm were used.

Next, the above-mentioned glass ingredient material and sub ingredient material were added to 100 mol of the barium calcium titanate material and the result was wet mixed (wet pulverized) using water as a solvent by a ball mill for 16 hours. After this, the result was dried at 130° C. by hot air to obtain a dielectric material.

The dielectric material contained, with respect to 100 mol of the barium calcium titanate material, the glass ingredient: 3 mol, $Y_2O_3$: 0 to 4 mol (see samples 21 to 28 of Table 4), MgO: 0.5 mol, MnO: 0.2 mol (or $Cr_2O_3$: 0.2 mol), and $V_2O_5$: 0.03 mol.

TABLE 4

| Sample no. | MgO | MnO | Cr2O3 | Y2O3 | Dy2O3 | Ho2O3 | V2O5 | mol % Glass ing. |
|---|---|---|---|---|---|---|---|---|
| *21 | 0.5 | 0.2 | 0 | 0 | 0 | 0 | 0.03 | 3 |
| 22 | 0.5 | 0.2 | 0 | 0.5 | 0 | 0 | 0.03 | 3 |
| 23 | 0.5 | 0.2 | 0 | 1 | 0 | 0 | 0.03 | 3 |
| 24 | 0.5 | 0 | 0.2 | 1 | 0 | 0 | 0.03 | 3 |
| 25 | 0.5 | 0.2 | 0 | 2 | 0 | 0 | 0.03 | 3 |
| 26 | 0.5 | 0 | 0.2 | 2 | 0 | 0 | 0.03 | 3 |

TABLE 4-continued

| Sample no. | MgO | MnO | Cr2O3 | Y2O3 | Dy2O3 | Ho2O3 | V2O5 | mol % Glass ing. |
|---|---|---|---|---|---|---|---|---|
| **27 | 0.5 | 0.2 | 0 | 3 | 0 | 0 | 0.03 | 3 |
| *28 | 0.5 | 0.2 | 0 | 4 | 0 | 0 | 0.03 | 3 |
| 29 | 0.5 | 0.2 | 0 | 0 | 0.5 | 0 | 0.03 | 3 |
| 30 | 0.5 | 0.2 | 0 | 0 | 1 | 0 | 0.03 | 3 |
| 31 | 0.5 | 0.2 | 0 | 0 | 2 | 0 | 0.03 | 3 |
| 32 | 0.5 | 0.2 | 0 | 0 | 0 | 1 | 0.03 | 3 |
| *33 | 0.5 | 0.2 | 0 | 2 | 0 | 0 | 0.03 | 0.5 |
| 34 | 0.5 | 0.2 | 0 | 2 | 0 | 0 | 0.03 | 1 |
| 35 | 0.5 | 0.2 | 0 | 2 | 0 | 0 | 0.03 | 2 |
| 36 | 0.5 | 0.2 | 0 | 2 | 0 | 0 | 0.03 | 4 |
| **37 | 0.5 | 0.2 | 0 | 2 | 0 | 0 | 0.03 | 5 |
| *38 | 0.5 | 0.2 | 0 | 2 | 0 | 0 | 0.03 | 6 |

*Comp. Ex.
**Ref. Ex.

The relative dielectric constant, IR lifetime, and X5R characteristics of the sintered body samples and capacitor samples in the Example are shown in Table 5.

TABLE 5

| Sample no. | Firing temp. (° C.) | Dielectric constant | Life (h) | X5R char. | Ratio having crystal grain boundaries of 1 nm or less | Ratio having crystal grain boundaries of 0.7 nm or less |
|---|---|---|---|---|---|---|
| *21 | 1180 | 3390 | 20 | X | 78 | 74 |
| 22 | 1200 | 3100 | 120 | ◯ | 68 | 60 |
| 23 | 1220 | 2820 | 280 | ◯ | 44 | 40 |
| 24 | 1220 | 2800 | 220 | ◯ | 42 | 34 |
| 25 | 1240 | 2730 | 250 | ◯ | 34 | 30 |
| 26 | 1240 | 2610 | 240 | ◯ | 30 | 26 |
| **27 | 1260 | 2330 | 210 | ◯ | 26 | 20 |
| *28 | ≧1280 | Insuf. Firing | | | 18 | 2 |
| 29 | 1220 | 2740 | 160 | ◯ | 56 | 48 |
| 30 | 1220 | 2760 | 280 | ◯ | 36 | 34 |
| 31 | 1240 | 2700 | 300 | ◯ | 30 | 26 |
| 32 | 1240 | 2750 | 230 | ◯ | 32 | 26 |
| *33 | ≧1280 | Insuf. Firing | | | 14 | 2 |
| 34 | 1240 | 2780 | 150 | ◯ | 60 | 54 |
| 35 | 1200 | 2730 | 180 | ◯ | 44 | 34 |
| 36 | 1200 | 2720 | 150 | ◯ | 36 | 30 |
| **37 | 1180 | 2600 | 170 | ◯ | 22 | 16 |
| *38 | 1180 | 2360 | 120 | X | 16 | 14 |

*Comp. Ex.
**Ref. Ex.

Thickness of Dielectric Layers

The obtained sintered body was cut at a plane perpendicular to the internal electrodes, the cut surface was polished, then a plurality of locations of the polished surface were observed by a metal microscope. Next, the image observed by the metal microscope was digitally processed to find the average thickness of the dielectric layers after sintering. The dielectric layers of each sample had an average thickness of 2.5 μm.

Average Grain Size of Dielectric Grains in Dielectric Layers

The obtained sintered body was polished and chemically etched, then was observed under a scan type electron microscope (SEM). The cord method was used, while assuming the shapes of the dielectric grains 20 in the dielectric layers to be spheres, to measure the dielectric grains for average grain size. The average grain size was the average for 250 measurement points. The average grain size was 0.20 to 0.26 μm.

Thickness of Crystal Grain Boundaries of Dielectric Grains in Dielectric Layer

The obtained sintered body was mechanically polished and ion milled, then was measured for the thickness of the crystal grain boundaries by a transmission type electron microscope (TEM) as follows:

The TEM was used to observe an area of 700 nm×500 nm. The thickness of the crystal grain boundaries 22 was measured at points 100 nm apart along the crystal grain boundaries 22 observed in the field from any three-way point 24 of the crystal grain boundaries 22. This was performed for a plurality of fields. The thicknesses of the crystal grain boundaries 22 were measured for a total of 50 points. From the measurement results, the ratio (%) of pairs of grains with a thickness of the crystal grain boundaries 22 of 1 nm or less and the ratio (%) of pairs of grains with a thickness of the crystal grain boundaries of 0.7 nm or less were calculated for each sample. The results are shown in Table 5.

Figure 5A:
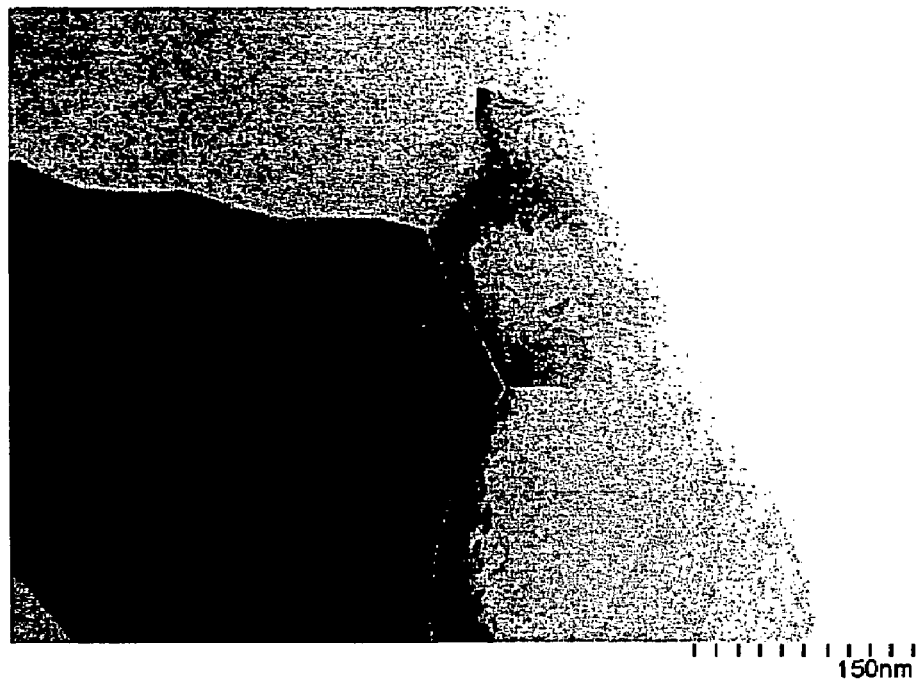
FIG. 5A is a TEM photograph of dielectric grains forming the dielectric layers in a multilayer ceramic capacitor according to an example of the present invention.
Figure 5B:
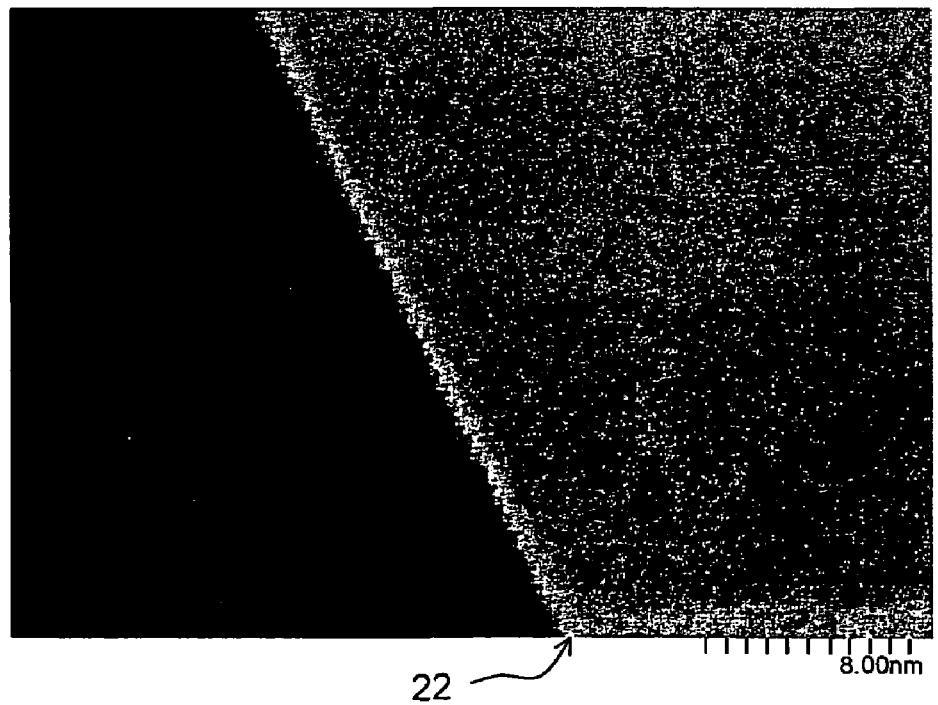
FIG. 5B is an enlarged photograph of a crystal grain boundary shown in FIG. 5A.
Figure 6A:
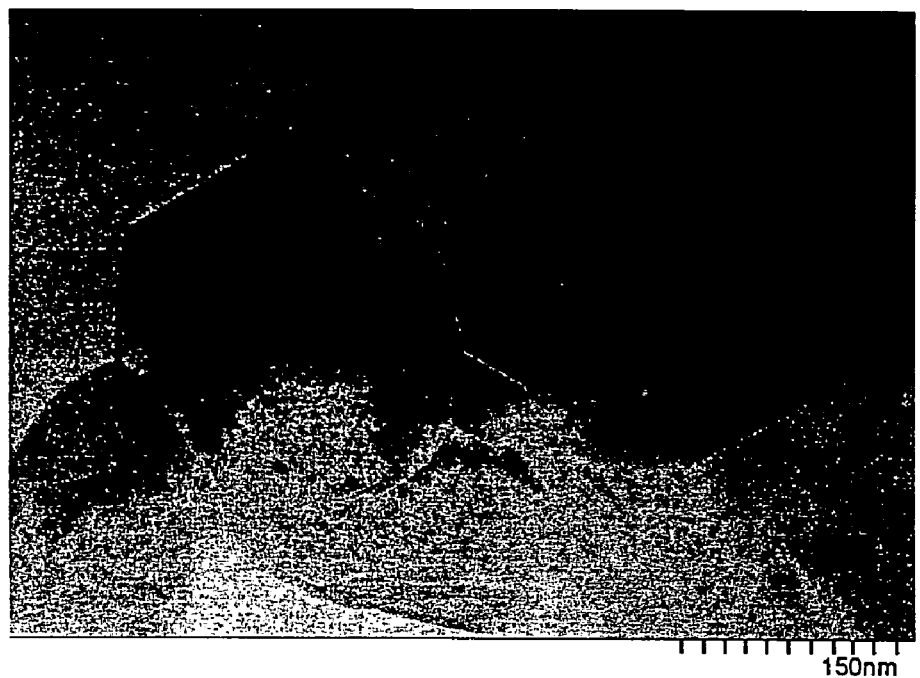
FIG. 6A is a TEM photograph of dielectric grains forming the dielectric layers in a multilayer ceramic capacitor according to a comparative example of the present invention.
Figure 6B:
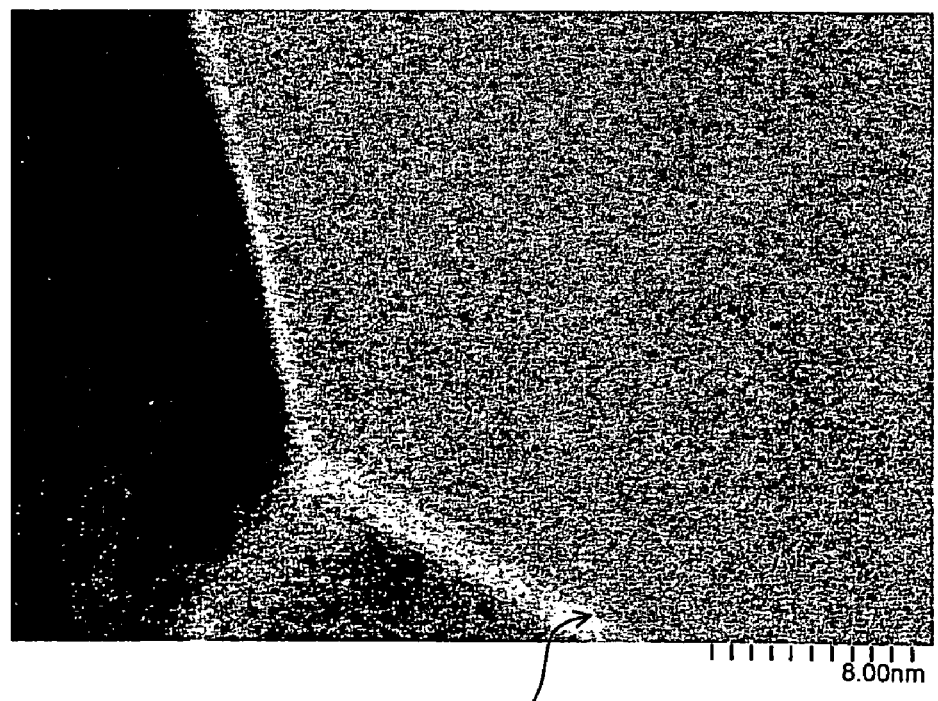
FIG. 6B is an enlarged photograph of a crystal grain boundary shown in FIG. 6A.

Note that a TEM photograph of an example of the invention, that is, sample no. 23, in Table 4 and Table 5 is shown in FIG. 5A, while its enlarged photograph is shown in FIG. 5B. Further, a TEM photograph of a comparative example, that is, sample no. 28, is shown in FIG. 6A, while its enlarged photograph is shown in FIG. 6B.

Evaluation 2

In this Example, a relative dielectric constant of 2300 or more is preferable, while 2500 or more and 2700 or more are more preferable. Further, in this Example, an IR lifetime of 100 hours or more is preferable, and 120 hours or more is more preferable.

As shown by sample nos. 21 to 28 of Table 5, it was confirmed that in a multilayer ceramic capacitor where the ratio of pairs of grains having a thickness of the crystal grain boundaries of 1 nm or less is 20% to 70% of the total grains, the EIA X5R characteristic is satisfied and a high dielectric constant and high reliability are exhibited. Further, more preferably, it was learned that in a multilayer ceramic capacitor where the ratio of pairs of grains having a thickness of the crystal grain boundaries of 0.7 nm or less is 25% to 65% of the total grains, similarly the EIA X5R characteristic is satisfied and a high dielectric constant and high reliability (high lifetime) are exhibited.

When comparing the dielectric part such as the core and the grain boundary part, generally the insulation resistance is higher at the grain boundary part. Therefore, the greater the ratio of the grain boundaries having a thickness of 1 nm or more, the higher the reliability probably becomes. However, on the other hand, when similarly comparing the dielectric part and grain boundary part, generally the dielectric constant is higher at the dielectric part. Therefore, the smaller the ratio of the grain boundaries having a thickness of 1 nm or less, the higher the multilayer ceramic capacitor probably becomes in dielectric constant. To obtain preferable values in both the reliability and dielectric constant, the ratio of grain boundaries having a thickness of 1 nm or less (preferably 0.7 nm or less) is probably in the above-mentioned range.

Note that it was confirmed that the ratio of pairs of grains having a thickness of the crystal grain boundaries of 1 nm or less (or 0.7 nm or less) changes in accordance with the amount of addition of $Y_2O_3$. As shown in the other later explained examples, the ratio changes by methods other than the amount of addition of $Y_2O_3$ as well.

Example 8

Except for adding, instead of $Y_2O_3$, $Dy_2O_3$ or $Ho_2O_3$ in the amounts of addition shown in Table 4 with respect to 100 mol of the barium calcium titanate material as shown by sample nos. 29 to 32 of Table 4, the same procedure was followed as in sample no. 23 of Example 7 to prepare sintered body samples and capacitor samples which were evaluated in the same way. As shown in Table 5, trends similar to Example 7 were confirmed. From this example, it is believed that even if replacing Y with other rare earths (Sc, Er, Tm, Yb, Lu, Tb, Gd, and Eu), similar effects are obtained.

Example 9

Except for changing the amount of the glass ingredient to 0.5 to 6 mol in range as shown by sample nos. 33 to 38 of Table 4, the same procedure was followed as in sample no. 25 of Example 7 to prepare sintered body samples and capacitor samples which were evaluated in the same way. As shown in Table 5, trends similar to Example 7 were confirmed. That is, it was confirmed that in a multilayer ceramic capacitor where the ratio of grains having a thickness of the crystal grain boundaries of 1 nm or less is 20% to 70% of the total grains, the EIA X5R characteristic is satisfied and a high dielectric constant and high reliability are exhibited. Further, more preferably, it was confirmed that in a multilayer ceramic capacitor where the ratio of grains having a thickness of the crystal grain boundaries of 0.7 nm or less is 25% to 65% of the total grains, similarly the EIA X5R characteristic is satisfied and a high dielectric constant and high reliability (high lifetime) are exhibited.

Further, it was confirmed that even by changing the amount of addition of the glass ingredient or the amount of Mg, the ratio of grains having a thickness of the crystal grain boundaries of 1 nm or less (or 0.7 nm or less) changed.

Example 10

Except for changing the firing temperature to 1180° C. to 1260° C. as shown by sample nos. 23a to 23e of Table 6, the same procedure was followed as in sample no. 23 of Example 7 to prepare sintered body samples and capacitor samples which were evaluated in the same way. As shown in Table 6, trends similar to Example 7 were confirmed. That is, it was confirmed that in a multilayer ceramic capacitor where the ratio of grains having a thickness of the crystal grain boundaries of 1 nm or less is 20% to 70% of the total grains, the EIA X5R characteristic is satisfied and a high dielectric constant and high reliability are exhibited. Further, more preferably, it was confirmed that in a multilayer ceramic capacitor where the ratio of grains having a thickness of the crystal grain boundaries of 0.7 nm or less is 25% to 65% of the total grains, similarly the EIA X5R characteristic is satisfied and a high dielectric constant and high reliability (high lifetime) are exhibited.

Further, it was confirmed that even by changing the firing temperature, the ratio of grains having a thickness of the crystal grain boundaries of 1 nm or less (or 0.7 nm or less) changed.

TABLE 6

| Sample no. | Firing temp. (° C.) | Dielectric constant | Life (h) | X5R char. | Ratio having crystal grain boundaries of 1 nm or less | Ratio having crystal grain boundaries of 0.7 nm or less |
| --- | --- | --- | --- | --- | --- | --- |
| *23a | 1180 | 2090 | 70 | Good | 8 | 8 |
| **23b | 1200 | 2580 | 140 | Good | 24 | 18 |
| 23c | 1220 | 2820 | 280 | Good | 44 | 36 |
| **23d | 1240 | 2650 | 210 | Good | 22 | 16 |
| *23e | 1260 | 2490 | 90 | Good | 18 | 8 |
| *30a | 1180 | 1880 | 20 | Good | 6 | 6 |
| **30b | 1200 | 2500 | 150 | Good | 26 | 20 |
| 30c | 1220 | 2760 | 280 | Good | 36 | 30 |
| **30d | 1240 | 2660 | 180 | Good | 28 | 22 |
| *30e | 1260 | 2500 | 50 | Good | 18 | 10 |
| *32a | 1180 | 2020 | 60 | Good | 12 | 8 |
| *32b | 1200 | 2360 | 80 | Good | 24 | 18 |
| 32c | 1220 | 2750 | 230 | Good | 32 | 26 |
| **32d | 1240 | 2650 | 170 | Good | 22 | 16 |
| *32e | 1260 | 2540 | 60 | Good | 14 | 0 |

*Comp. Ex.
**Ref. Ex.

Example 11

Except for changing the firing temperature to 1180° C. to 1260° C. as shown by sample nos. 30a to 30e of table 6, the same procedure was followed as in sample no. 30 of Example 7 to prepare sintered body samples and capacitor samples which were evaluated in the same way. As shown in Table 6, trends similar to Example 10 were confirmed.

Example 12

Except for changing the firing temperature to 1180° C. to 1260° C. as shown by sample nos. 32a to 32e of Table 6, the same procedure was followed as in sample no. 32 of Example 7 to prepare sintered body samples and capacitor samples which were evaluated in the same way. As shown in Table 6, trends similar to Example 10 were confirmed.

The invention claimed is:

1. An electronic device having dielectric layers comprised of barium titanate as their main ingredient, wherein
in a plurality of ceramic grains forming said dielectric layers, a ratio of a number of ceramic grains, having a crystal grain boundary that is 1 nm or less in thickness and is present between that ceramic grain and another ceramic grain adjoining that ceramic grain, is 30% to 95% of the total number of the ceramic grains included in said dielectric layer,
the dielectric layers include, as sub ingredients, (a) magnesium oxide, (b) manganese (Mn) oxide and/or chromium (Cr) oxide, (c) rare earth oxide, (d) vanadium oxide, tungsten oxide, tantalum oxide, and/or niobium oxide and (e) a glass ingredient, and
with respect to the barium titanate as 100 mol,
the magnesium oxide is included in an amount of more than 0 to 2 mol or less,
a total of the manganese oxide and chromium oxide, converted to MnO and $Cr_2O_3$, is more than 0 to 0.5 mol or less,
the rare earth oxide is included in an amount of more than 0 to less than 4 mol,
a total of the vanadium oxide, tungsten oxide, tantalum oxide, and/or niobium oxide is more than 0 to 0.5 mol or less, and
the glass ingredient is included in an amount of more than 0.5 to less than 6 mol.

2. An electronic device having dielectric layers comprised of barium titanate as their main ingredient, wherein
in a plurality of ceramic grains forming said dielectric layers, a ratio of number of ceramic grains, having a crystal grain boundary that is 0.75 nm or less in thickness and is present between that ceramic grain and another ceramic grain adjoining that ceramic grain, is 40% to 90% of the total number of the ceramic grains included in said dielectric layer,
the dielectric layers include, as sub ingredients, (a) magnesium oxide (b) manganese (Mn) oxide and/or chromium (Cr) oxide, (c) rare earth oxide, (d) vanadium oxide, tungsten oxide, tantalum oxide, and/or niobium oxide and (e) a glass ingredient, and
with respect to the barium titanate as 100 mol,
the magnesium oxide is included in an amount of more than 0 to 2 mol or less,
a total of the manganese oxide and chromium oxide, converted to MnO and $Cr_2O_3$, is more than 0 to 0.5 mol or less,
the rare earth oxide is included in an amount of more than 0 to less than 4 mol,
a total of the vanadium oxide, tungsten oxide, tantalum oxide, and/or niobium oxide is more than 0 to 0.5 mol or less, and
the glass ingredient is included in an amount of more than 0.5 to less than 6 mol.

3. The electronic device as set forth in claim 1, wherein the dielectric layers have a thickness of 3 μm or less.

4. The electronic device as set forth in claim 1, wherein the ceramic grains have an average grain size of 0.3 μm or less.

5. The electronic device as set forth in claim 1, comprised of a multilayer ceramic capacitor having a device body comprised of said dielectric layers and internal electrode layers alternately stacked.

6. The electronic device as set forth in claim 5, wherein said internal electrode layers are comprised of a base metal as their main ingredient.

7. An electronic device having dielectric layers comprised of barium calcium titanate expressed by $Ba_{1-x}Ca_xTiO_3$ ($0.001 \leq x \leq 0.15$) as their main ingredient, wherein
in a plurality of ceramic grains forming said dielectric layers, a ratio of a number of ceramic grains, having a crystal grain boundary that is 1 nm or less in thickness and is present between that ceramic grain and another ceramic grain adjoining that ceramic grain, is 20% to 70% of the total number of the ceramic grains included in said dielectric layer,
the dielectric layers include, as sub ingredients, (a) magnesium oxide, (b) manganese (Mn) oxide and/or chromium (Cr) oxide, (c) rare earth oxide, (d) vanadium oxide, tungsten oxide, tantalum oxide, and/or niobium oxide and (e) a glass ingredient, and
with respect to the barium calcium titanate as 100 mol,
the magnesium oxide is included in an amount of more than 0 to 2 mol or less,
a total of the manganese oxide and chromium oxide, converted to MnO and $Cr_2O_3$, is more than 0 to 0.5 mol or less,
the rare earth oxide is included in an amount of more than 0 to less than 4 mol,
a total of the vanadium oxide, tungsten oxide, tantalum oxide, and/or niobium oxide is more than 0 to 0.5 mol or less, and
the glass ingredient is included in an amount of more than 0.5 to less than 6 mol.

8. An electronic device having dielectric layers comprised of barium calcium titanate expressed by $Ba_{1-x}Ca_xTiO_3$ ($0.001 \leq x \leq 0.15$) as their main ingredient, wherein
in a plurality of ceramic grains forming said dielectric layers, a ratio of a number of ceramic grains, having a crystal grain boundary that is 0.75 nm or less in thickness and is present between that ceramic grain and another ceramic grain adjoining that ceramic grain, is 25% to 65% of the total number of the ceramic grains included in said dielectric layer,
the dielectric layers include, as sub ingredients, (a) magnesium oxide, (b) manganese (Mn) oxide and/or chromium (Cr) oxide, (c) rare earth oxide, (d) vanadium oxide, tungsten oxide, tantalum oxide, and/or niobium oxide and (e) a glass ingredient, and
with respect to the barium calcium titanate as 100 mol,
the magnesium oxide is included in an amount of more than 0 to 2 mol or less,
a total of the manganese oxide and chromium oxide, converted to MnO and $Cr_2O_3$, is more than 0 to 0.5 mol or less,
the rare earth oxide is included in an amount of more than 0 to less than 4 mol, a total of the vanadium oxide, tungsten oxide, tantalum oxide, and/or niobium oxide is more than 0 to 0.5 mol or less, and the glass ingredient is included in an amount of more than 0.5 to less than 6 mol.

9. The electronic device as set forth in claim 7, wherein the dielectric layers have a thickness of 3 μm or less.

10. The electronic device as set forth in claim 7, wherein the ceramic grains have an average grain size of 0.3 μm or less.

11. The electronic device as set forth in claim 7, comprised of a multilayer ceramic capacitor having a device body comprised of said dielectric layers and internal electrode layers alternately stacked.

12. The electronic device as set forth in claim 11, wherein said internal electrode layers are comprised of a base metal as their main ingredient.

* * * * *